(12) United States Patent
Vuk et al.

(10) Patent No.: US 7,063,912 B2
(45) Date of Patent: Jun. 20, 2006

(54) FUEL CELL ASSEMBLY SYSTEM

(75) Inventors: Carl Thomas Vuk, Denver, IA (US); Richard Lee Forest, Colona, IL (US)

(73) Assignee: Deere & Company, Moline, IL (US)

( * ) Notice: Subject to any disclaimer, the term of this patent is extended or adjusted under 35 U.S.C. 154(b) by 451 days.

(21) Appl. No.: 10/287,208

(22) Filed: Nov. 1, 2002

(65) Prior Publication Data

US 2004/0086758 A1    May 6, 2004

(51) Int. Cl.
*H01M 8/02* (2006.01)
*H01M 8/24* (2006.01)

(52) U.S. Cl. ............................ 429/38; 429/12; 429/26; 429/35

(58) Field of Classification Search .................. 429/12, 429/25, 26, 32, 35, 38
See application file for complete search history.

(56) References Cited

U.S. PATENT DOCUMENTS

| | | | |
|---|---|---|---|
| 4,623,596 A | 11/1986 | Kamoshita | 429/26 |
| 4,857,420 A | 8/1989 | Maricle et al. | 429/30 |
| 5,350,642 A * | 9/1994 | Akagi | 429/32 |
| 5,612,149 A | 3/1997 | Hartvigsen et al. | 429/26 |
| 5,741,605 A | 4/1998 | Gillett et al. | 429/31 |
| 5,945,232 A | 8/1999 | Ernst et al. | 429/32 |
| 6,030,718 A | 2/2000 | Fuglevand et al. | 429/26 |
| 6,110,612 A | 8/2000 | Walsh | 429/13 |
| 6,218,035 B1 | 4/2001 | Fuglevand et al. | 429/30 |
| 6,326,095 B1 | 12/2001 | Kneidel | 429/19 |
| 6,387,556 B1 | 5/2002 | Fuglevand et al. | 429/22 |
| 6,455,179 B1 * | 9/2002 | Sugita et al. | 429/12 |
| 6,468,682 B1 | 10/2002 | Fuglevand et al. | 429/26 |
| 6,692,859 B1 * | 2/2004 | Mukerjee et al. | 429/34 |
| 2003/0008194 A1 * | 1/2003 | Cargneli et al. | 429/39 |

FOREIGN PATENT DOCUMENTS

| | | |
|---|---|---|
| CA | 2316504 | 2/2001 |
| EP | 0 585 049 A1 | 3/1994 |
| WO | 01/41234 A1 | 6/2001 |

OTHER PUBLICATIONS

Dais Analytic Corporation—Fuel Cell Energy Technology; www.daisanalytic.com; 5 pages.
Fuel Cell Store. com; Fuel Cell Stack Index; www.fuelcellstore.com; 4 pages.

* cited by examiner

*Primary Examiner*—Gregg Cantelmo

(57) ABSTRACT

A fuel cell assembly includes a manifold having a plurality of fuel cell connecting zones. At least some of the zones have differing characteristics such as area and arrangement of electrical connections and inlet and outlet ports corresponding to differing electrical power capacities. The assembly also includes one or more fuel cell stacks. At least some of the stacks have differing electrical power capacities, differing characteristics corresponding to the differing characteristics of the manifold zone, and corresponding differing arrangements of electrical connections and inlet and outlet ports. These differing characteristics are designed so that a fuel cell stack of a particular capacity can be connected only to a manifold zone corresponding to such capacity.

14 Claims, 3 Drawing Sheets

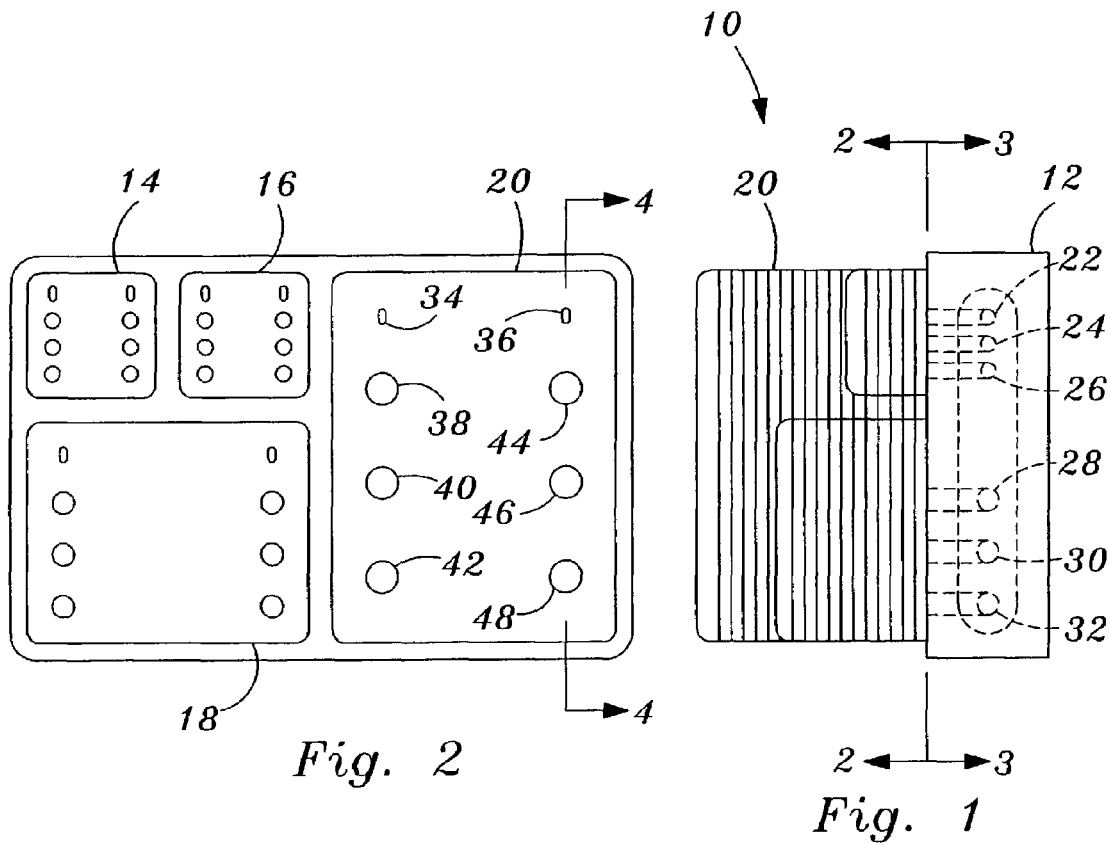
Fig. 1
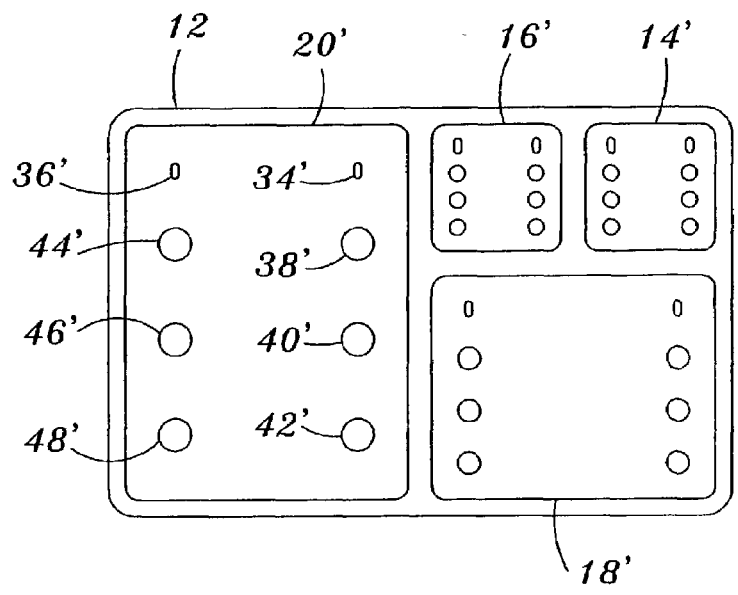
Fig. 2
Fig. 3

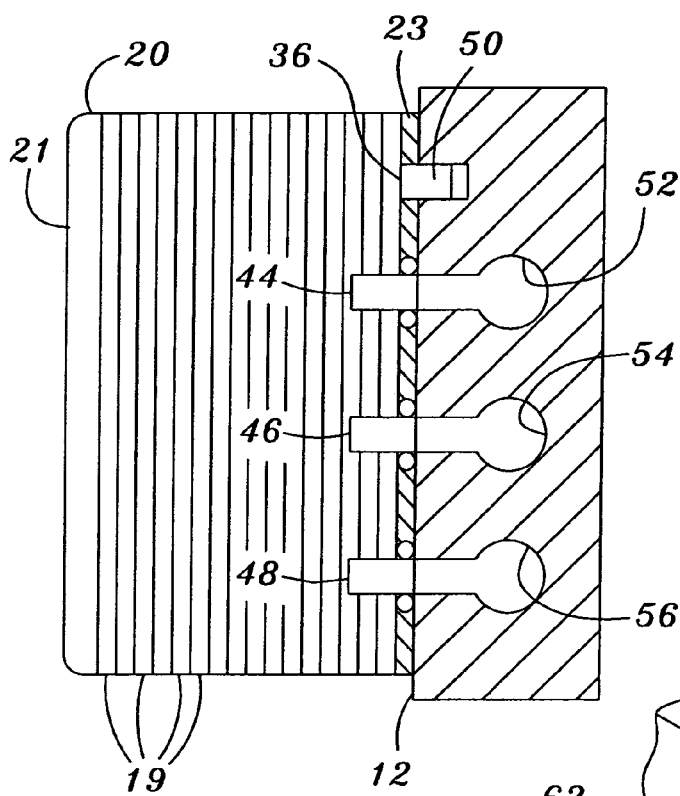
Fig. 4
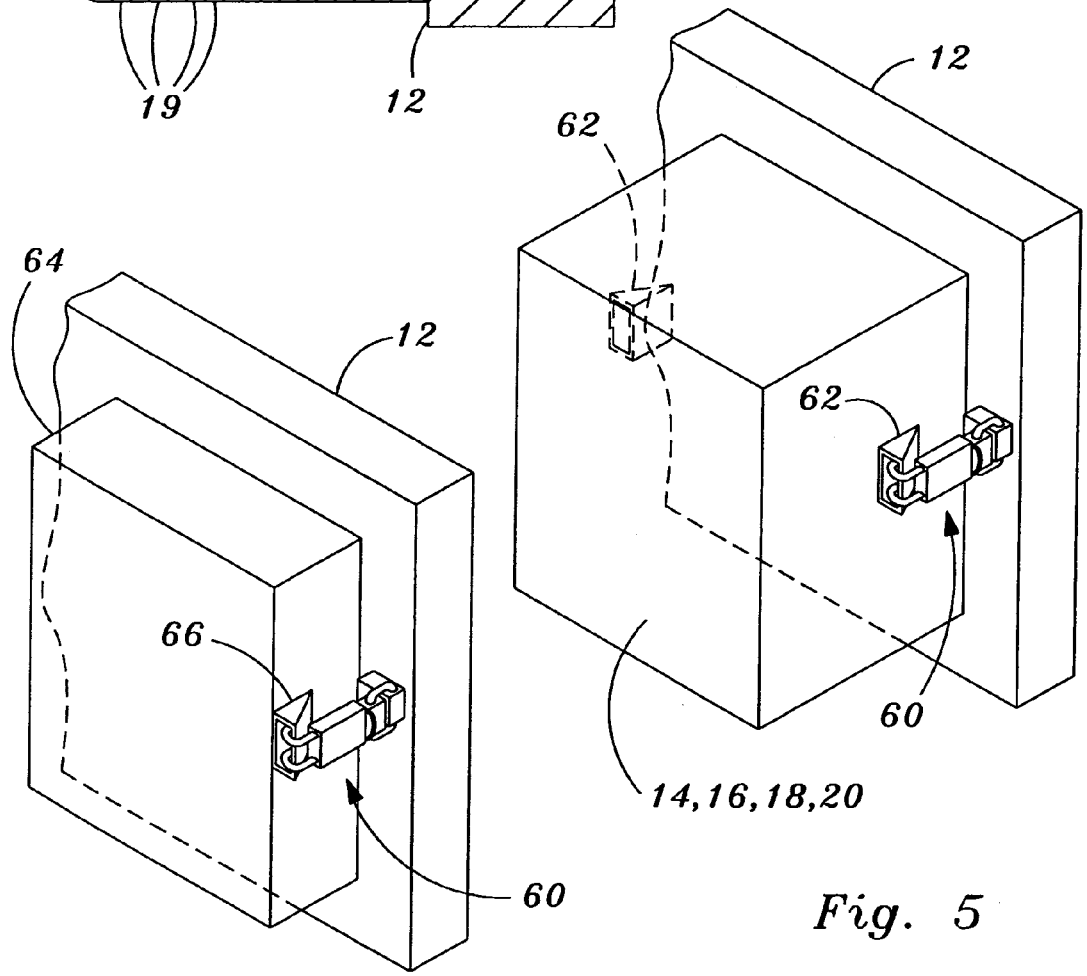
Fig. 5
Fig. 6

FUEL CELL ASSEMBLY SYSTEM

BACKGROUND OF THE INVENTION

The present invention relates to a fuel cell assembly system.

It is likely that fuel cells will be used in future vehicles. For example, fuel cells could be used as an auxiliary power source which could supply power for lights, electronics, electric drives and electrically powered implements attached to such a vehicle. The amount of fuel cell generated power needed will vary as a function of customer selected options and usage. Therefore, there will be a need for fuel cell assemblies of varying capacity.

SUMMARY

Accordingly, an object of this invention is to provide a fuel cell assembly whose capacity can be easily adapted to differing power needs.

This and other objects are achieved by the present invention, wherein a fuel cell assembly includes a manifold having a plurality of fuel cell connecting zones. At least some of the zones have differing characteristics such as area and arrangement of fuel cell connecting components and inlet and outlet ports corresponding to differing electrical power capacities. The assembly also includes a plurality of fuel cell stacks. At least some of the stacks have differing electrical power capacities, differing characteristics corresponding to the differing characteristics of the manifold zone, and corresponding differing arrangements of inlet and outlet ports. These differing characteristics are designed so that a fuel cell stack of a particular capacity can be connected only to a manifold zone corresponding to such capacity. A block-off plate is provided for coupling to a manifold zone where it is desired not to place a fuel cell stack. A connector arrangement is provided which seals the manifold connections when no block-off plate or fuel cell stack is coupled to a particular manifold zone and which eliminates the need for the block-off plate.

BRIEF DESCRIPTION OF THE DRAWING

FIG. 1 is a side elevation view of a fuel cell assembly according to the present invention.

FIG. 2 is view along lines 2—2 of FIG. 1.

FIG. 3 is view along lines 3—3 of FIG. 1.

FIG. 4 is view along lines 4—4 of FIG. 2.

FIG. 5 is a perspective view of a fuel cell module mounted to a manifold of the present invention.

FIG. 6 is a perspective view of a block-off plate mounted to a manifold of the present invention.

DETAILED DESCRIPTION

Figure 7:
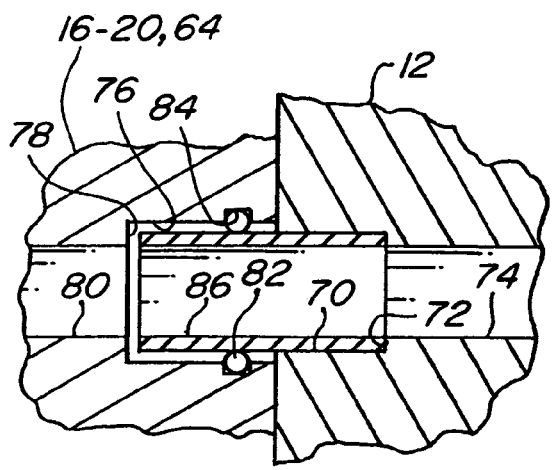
FIG. 7 is a detailed sectional view of a connection between a fuel cell module and the manifold of the present invention.

Referring to FIGS. 1 and 2, a fuel cell assembly 10 includes a manifold 12, which may be made of a solid piece of metallic material, such as aluminum, although a plastic or polymer material could satisfy the mechanical requirements of the material. Coupled to the side of the manifold 12 are a plurality of fuel cell stacks 14, 16, 18 and 20. Each stack includes a plurality of standard commercially available fuel cells 19 coupled together in a conventional manner to form a fuel cell stack. Each stack preferably has a different power capacity and a different characteristic, such as an area or "footprint" on its side facing the manifold 12. For example, stacks 14 and 16 may have a 1 kilowatt capacity, stack 18 may have a 5 kilowatt capacity and stack 20 may have a 10 kilowatt capacity. As best seen in FIG. 1, the manifold 12 includes individual passages formed therein for the communication of hydrogen fuel, air and coolant into and out of the fuel cell stacks, including hydrogen inlets 22 and 28, coolant inlets 24 and 30, and air outlets 26 and 32.

As best seen in FIG. 2, fuel cell stack 20 includes a positive electrical terminal 34, a negative electrical terminal 36, a hydrogen inlet 38, a coolant inlet 40, an air outlet 42, an air inlet 44, a coolant outlet 46 and a hydrogen outlet 48. Fuel cell stacks 14, 16 and 18 have similar components similarly arranged, but stacks with different capacities will have different spacings among their terminals, inlets and outlets.

As best seen in FIG. 3, the manifold 12 has a plurality of zones 14', 16', 18' and 20', each corresponding to one of the fuel cell stacks 14, 16, 18 and 20. The zones 14', 16', 18' and 20' preferably have differing characteristics corresponding to the differing characteristics of the fuel cell stacks 14, 16, 18 and 20. For example, zones 14' and 16' may have a smaller area or "footprint" corresponding to a small capacity fuel cell stack, zone 18' may have an intermediate area or "footprint" corresponding to an intermediate capacity fuel cell stack and zone 20' may have a larger area or "footprint" corresponding to a larger capacity fuel cell stack. In each zone the separation of the electrical connections and inlet and outlet ports is larger or smaller, in proportion to the dimensions of the corresponding zone. Manifold zone 20' includes a positive electrical terminal 34' a negative electrical terminal 36', a hydrogen outlet 38', a coolant outlet 40', an air inlet 42', an air outlet 44', a coolant inlet 46' and a hydrogen inlet 48'.

FIG. 4 is a sectional view which shows the right-hand (viewing FIG. 2) set of connections between the fuel cell stack 20 and the manifold 12. Negative terminal 36 is connected to a negative conductor 50 in the manifold 12. Air inlet port 44 is connected to an air supply passage 52 in the manifold 12. Coolant outlet port 46 is connected to a coolant passage 54 in the manifold 12. Hydrogen outlet port 48 is connected to a hydrogen passage 56 in the manifold 12.

Referring now to FIG. 5, a fuel cell stack 14, 16, 18 or 20 is clamped to the manifold 12 by a pair of spring toggle clamps 60 on opposite sides of the stack. Each clamp 60 releasably engages a tab 62 formed on the side of the stack.

Referring now to FIG. 6, a block-off plate 64 may be clamped to the manifold 12 in place of one or more of the fuel cell stacks 14, 16, 18 or 20. Each block-off plate 64 includes a pair of tabs 66 which engage a pair of the spring toggle clamps 60.

FIG. 7 illustrates a representative connection between the manifold 12 and a fuel cell stack 16–20 or a block-off plate 64. A bore 70 extends into the manifold 12 and forms an annular shoulder 72 between bore 70 and a smaller diameter passage 74. A bore 76 extends into the fuel cell stack 16–20 and forms an annular shoulder 78 between bore 76 and a smaller diameter passage 80. The bore 76 will be a blind bore and there will be no passage 80 in the case of block-off plate 64. An O-ring seal 82 is mounted in an annular groove 84 formed in the wall of bore 76. A cylindrical tube 86 has one end sealingly received by bore 70, such as a press fit, and engaging shoulder 72. The other end of tube 86 is releasably received by bore 76 and is sealingly engaged by O-ring 82. Such a connection would be used for each of the ports 38–48.

Figure 9:
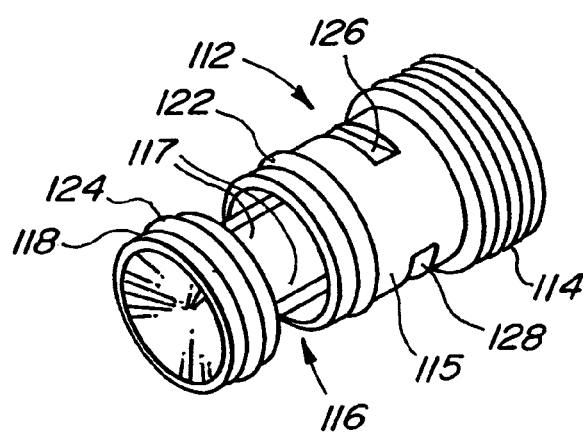
FIG. 9 is a perspective view of a plug part of the connection of FIG. 8.
Figure 8:
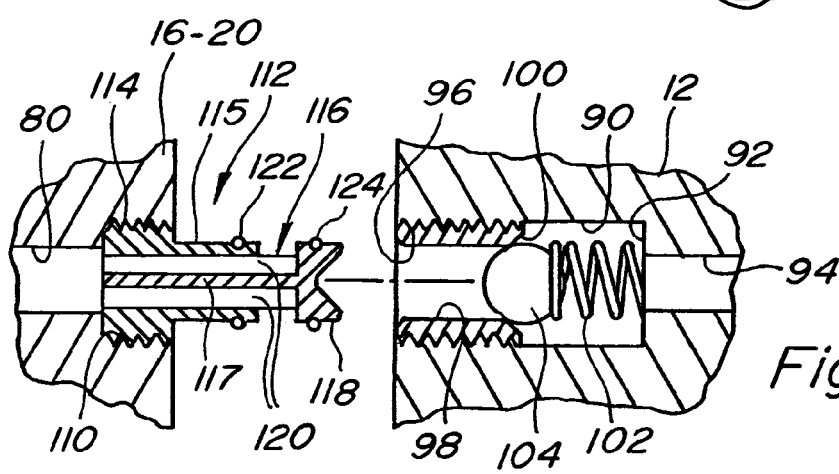
FIG. 8 is a detailed sectional view of an alternate embodiment of a connection between a fuel cell module and the manifold of the present invention in a disconnected state.
Figure 10:
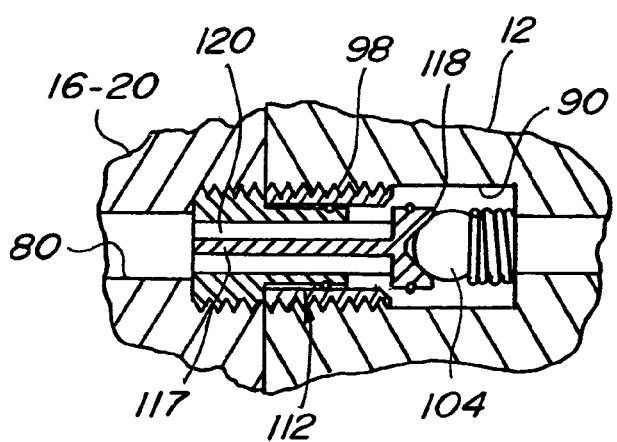
FIG. 10 is detailed sectional view of the connection of FIG. 8 in a connected state.

FIGS. 8–10 illustrates an alternate connection between the manifold 12 and a fuel cell stack 16–20. This alternate connection self-seals the various manifold ports and eliminates the need for the block-off plate. Referring to FIG. 8, a bore 90 extends into the manifold 12 and forms an annular shoulder 92 between bore 90 and a smaller diameter passage 94. The outer portion 96 of bore 90 forms screw threads. A check valve seat member 98 is screwed into the threaded portion 96 and forms a check valve seat 100. A spring 102 is mounted in the bore 90 and urges a check valve ball 104 into engagement with seat 100.

A threaded bore 110 extends into the fuel cell stack 16–20 and receives a valve plunger 112. Referring to FIGS. 8 and 9, the plunger 112 has a hollow threaded base 114, a hollow cylindrical sleeve 115, a central stem 116 and a ball engager 118 on the outer end of the stem 116. The stem comprises four axially and radially extending web members 117. The base 114, sleeve 115 and stem 116 form passages 120 which communicate the end of the stem 116 with passage 80 in the stack 16–20. O-ring seals 122 and 124 are mounted in grooves on the sleeve 115 and engager 118, respectively. When the fuel cell stack 16–20 is spaced apart from the manifold 12, the ball 104 is held against seat 100 and the corresponding manifold passage is sealed from the exterior environment. As best seen in FIG. 9, flat surfaces 126, 128 are formed on the periphery of sleeve 115 so that plunger 112 may be manipulated with a wrench (not shown).

Referring now to FIG. 10, when one of the fuel cell stacks 16–20 is placed against the manifold 12, the ball engager 118 moves the ball 104 away from seat 100 and the manifold passage is communicated with the corresponding cell stack passage via passages 120.

If no fuel cell stack is to be mounted to a particular manifold zone, then a simple threaded plug (not shown) may be screwed into the ports in that zone to seal them from the environment.

While the present invention has been described in conjunction with a specific embodiment, it is understood that many alternatives, modifications and variations will be apparent to those skilled in the art in light of the foregoing description. For example, instead of different zones and stacks having different areas, they could have similar areas, but have different spacings or arrangements of components. Accordingly, this invention is intended to embrace all such alternatives, modifications and variations which fall within the spirit and scope of the appended claims.

We claim:

1. A fuel cell assembly comprising:
a manifold having a first fuel cell connecting zone having a first characteristic and at least a second fuel cell connecting zone having a second characteristic, the first characteristic being different from the second characteristic, each zone having coolant, fuel and air inlet and outlet ports, the manifold having a plurality of passages therein communicating with said ports;
a first group of fuel cells coupled together to form a first fuel cell stack having a first electrical power capacity, the first stack being adapted to be operatively coupled to said first zone of the manifold and to the coolant, fuel and air inlet and outlet ports associated with said first zone; and
at least a second group of fuel cells coupled together to form a second fuel cell stack having a second electrical power capacity which differs from the first electrical power capacity, the second stack being adapted to be coupled to said second zone of the manifold and to the coolant, fuel and air inlet and outlet ports associated with said second zone, the first zone characteristic being such that only a fuel cell stack having said first capacity can be coupled thereto, and the second zone characteristic being such that only a fuel cell stack having said second capacity can be coupled thereto, the first and second characteristics compising first and second different spacings of inlet or outlet ports.

2. The fuel cell assembly of claim 1, wherein:
the manifold having at least a further fuel cell connecting zone having a further characteristic, the further characteristic being different from the first and second characteristic, the further zone having coolant, fuel and air inlet and outlet ports; and
a further group of fuel cells coupled together to form a further fuel cell stack having a further electrical power capacity, the further stack being operatively coupled to said further zone of the manifold and to the coolant, fuel and air inlet and outlet ports associated with said further zone, said further characteristic being such that only a fuel cell stack having said further capacity can be coupled thereto.

3. The fuel cell assembly of claim 1, wherein each fuel cell stack comprises:
a housing coupled to a molded base, the base and housing enclosing a plurality of fuel cells;
a pair of electrical connectors mounted in the base and electrically coupled to the fuel cells;
a hydrogen inlet formed in the base and for communicating hydrogen fuel to the fuel cells;
a hydrogen outlet formed in the base and for communicating hydrogen fuel from the fuel cells;
an air inlet formed in the base and for communicating air to the fuel cells;
an air outlet formed in the base and for communicating air from the fuel cells;
a coolant inlet formed in the base and for communicating coolant to the fuel cells; and
a coolant outlet formed in the base and for communicating coolant from the fuel cells.

4. The fuel cell assembly of claim 1, wherein each fuel cell stack comprises:
a housing coupled to a molded base, the base and housing enclosing a plurality of fuel cells;
a pair of electrical connectors mounted in the base and electrically coupled to the fuel cells, and a set of fuel, air and coolant inlets and outlets, the connectors and the set of inlets and outlets for the first stack has a first configuration, the connectors and the set of inlets and outlets for the second stack having a second configuration which differs from the first configuration.

5. The fuel cell assembly of claim 1, further comprising:
a block-off plate adapted for coupling to a zone of the manifold and sealing the ports of said zone from an exterior environment.

6. The fuel cell assembly of claim 5, wherein:
a larger diameter manifold bore extends into the manifold and forms an annular shoulder between said bore and a smaller diameter passage formed in the manifold;

a plate bore extends into the block-off plate;
an O-ring seal is mounted in an annular groove formed in the wall of plate bore; and
cylindrical tube has one end sealingly received by bore and engaging the shoulder, and the other end of tube is releasably received by the plate bore and is sealingly engaged by the O-ring seal.

7. The fuel cell assembly of claim 1, wherein:
at least one of the manifold ports comprises a bore which extends into the manifold and forms an annular shoulder, the bore having a threaded portion;
a hollow check valve seat member is screwed into the threaded portion and forms a check valve seat;
a check valve ball is received by the bore;
a spring is mounted in the bore and urges a check valve ball into engagement with seat to prevent communication between the manifold port and the fuel cell stack port; and
a valve plunger mounted in and projecting from the fuel cell stack port, when the fuel cell stack is placed against the manifold, the valve plunger engaging and moving the ball away from seat and opening communication between the manifold port and the fuel cell stack port.

8. The fuel cell assembly of claim 7, wherein:
the plunger has a hollow base received in a bore in the fuel cell stack, a hollow cylindrical sleeve projecting from the base, a central stem projecting from the base and the sleeve, and a check ball engager mounted on an outer end of the stem.

9. The fuel cell assembly of claim 8, wherein:
the stem comprises a plurality of axially and radially extending web members extending through the sleeve, and the base, sleeve and stem forming passages which communicates the end of the stem with the stack port.

10. The fuel cell assembly of claim 9, wherein:
O-ring seals and are mounted in grooves on the sleeve and check ball engager, respectively, said seals engaging the check valve seat member and preventing communication between the manifold port and the external environment when the plunger is received by the check valve seat member.

11. The fuel cell assembly of claim 1, wherein:
a larger diameter manifold bore extends into the manifold and forms an annular shoulder between said bore and a smaller diameter passage formed in the manifold;
a stack bore extends into the fuel cell stack or block-off plate;
an O-ring seal is mounted in an annular groove formed in the wall of stack bore; and
cylindrical tube has one end sealingly received by bore and engaging the shoulder, and the other end of tube is releasably received by the stack bore and is sealingly engaged by the O-ring seal.

12. A fuel cell assembly comprising:
a manifold having a first fuel cell connecting zone having a first characteristic and at least a second fuel cell connecting zone having a second characteristic, the first characteristic being different from the second characteristic, each zone having coolant, fuel and air inlet and outlet ports, the manifold having a plurality of passages therein communicating with said ports;
a first group of fuel cells coupled together to form a first fuel cell stack having a first electrical power capacity, the first stack being adapted to be operatively coupled to said first zone of the manifold and to the coolant, fuel and air inlet and outlet ports associated with said first zone; and
at least a second group of fuel cells coupled together to form a second fuel cell stack having a second electrical power capacity which differs from the first electrical power capacity, the second stack being adapted to be coupled to said second zone of the manifold and to the coolant, fuel and air inlet and outlet ports associated with said second zone, the first zone characteristic being such that only a fuel cell stack having said first capacity can be coupled thereto, and the second zone characteristic being such that only a fuel cell stack having said second capacity can be coupled thereto, the first and second characteristics comprising first and second areas having different sizes.

13. A fuel cell assembly comprising:
a manifold having a first fuel cell connecting zone having a first characteristic and at least a second fuel cell connecting zone having a second characteristic, the first characteristic being different from the second characteristic, each zone having coolant, fuel and air inlet and outlet ports, the manifold having a plurality of passages therein communicating with said ports;
a first group of fuel cells coupled together to form a first fuel cell stack having a first electrical power capacity, the first stack being adapted to be operatively coupled to said first zone of the manifold and to the coolant, fuel and air inlet and outlet ports associated with said first zone; and
at least a second group of fuel cells coupled together to form a second fuel cell stack having a second electrical power capacity which differs from the first electrical power capacity, the second stack being adapted to be coupled to said second zone of the manifold and to the coolant, fuel and air inlet and outlet ports associated with said second zone, the first zone characteristic being such that only a fuel cell stack having said first capacity can be coupled thereto, and the second zone characteristic being such that only a fuel cell stack having said second capacity can be coupled thereto, the first and second characteristics comprising first and second differing arrangements of inlet and outlet ports.

14. A fuel cell assembly comprising:
a manifold having a first fuel cell connecting zone having a first characteristic and at least a second fuel cell connecting zone having a second characteristic, the first characteristic being different from the second characteristic, each zone having coolant, fuel and air inlet and outlet ports, the manifold having a plurality of passages therein communicating with said ports;
a first group of fuel cells coupled together to form a first fuel cell stack having a first electrical power capacity, the first stack being adapted to be operatively coupled to said first zone of the manifold and to the coolant, fuel and air inlet and outlet ports associated with said first zone; and
at least a second group of fuel cells coupled together to form a second fuel cell stack having a second electrical power capacity which differs from the first electrical power capacity, the second stack being adapted to be coupled to said second zone of the manifold and to the coolant, fuel and air inlet and outlet ports associated with said second zone, the first zone characteristic being such that only a fuel cell stack having said first capacity can be coupled thereto, and the second zone characteristic being such that only a fuel cell stack having said second capacity can be coupled thereto, the first and second characteristics comprising first and second different arrangements of inlet or outlet ports.

* * * * *